Dec. 26, 1933.   M. WARD   1,941,371
PROCESS FOR MAKING FERTILIZER
Filed June 21, 1932
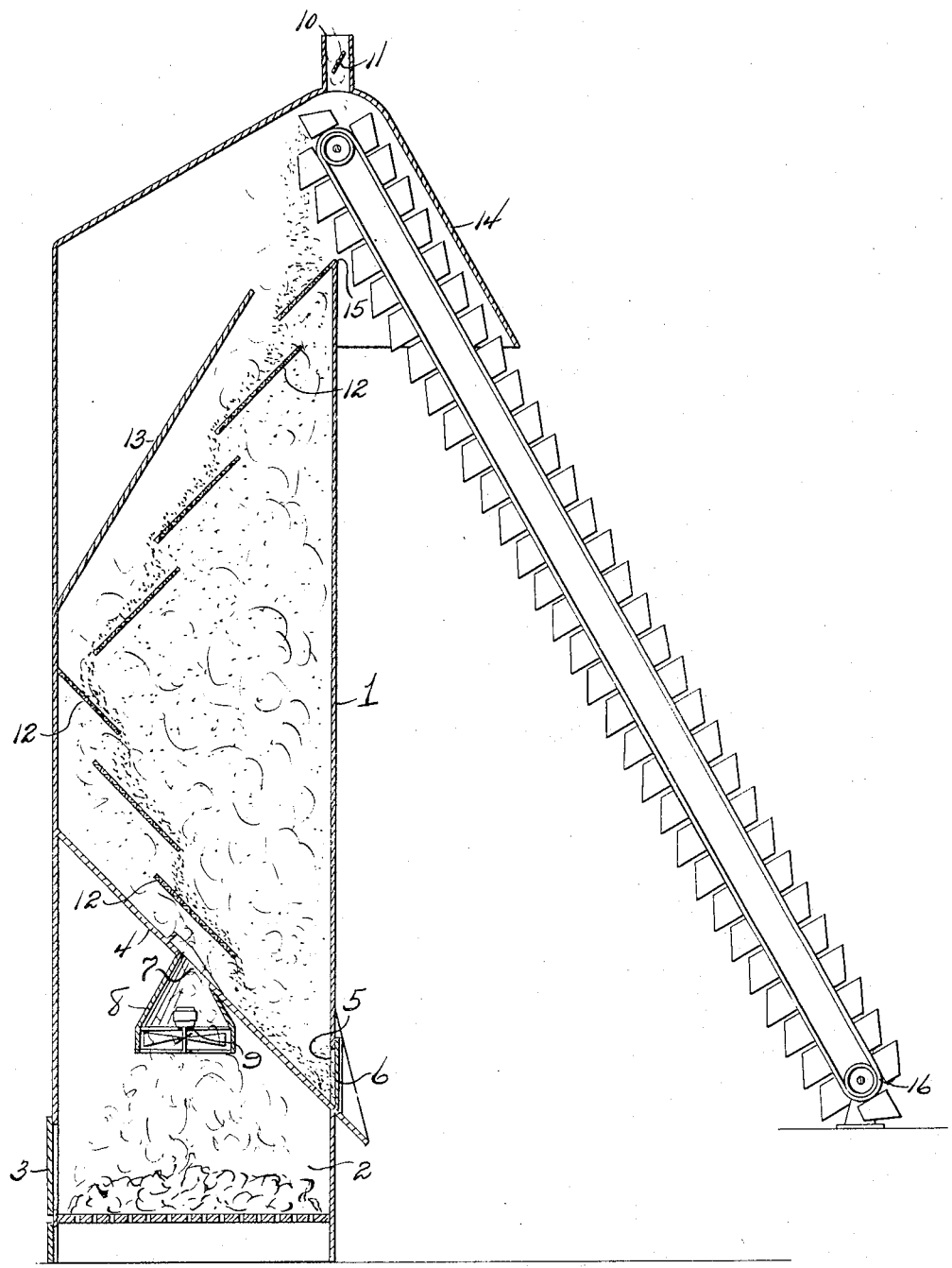
Michael Ward
INVENTOR
BY Victor J. Evans & Co.
ATTORNEY Patented Dec. 26, 1933

1,941,371

UNITED STATES PATENT OFFICE 1,941,371

PROCESS FOR MAKING FERTILIZER

Michael Ward, Pittsburgh, Pa., assignor of fifty per cent to Howard R. Morrison, Pittsburgh, Pa.

Application June 21, 1932. Serial No. 618,514

3 Claims. (Cl. 71—9)

This invention relates to a process or method of making fertilizer and has for the primary object, the provision of a method whereby a fertilizer of highly enriching qualities may be easily and economically produced by subjecting earth to smoke to become impregnated with unconsumed carbon from the smoke and then spreading the earth over the ground as a top dressing or mixing the earth with the ground so that the latter will be highly enriched to produce an efficient nourishment for vegetation growing therein.

With this and other objects in view, this invention consists in certain novel features of construction, combination and arrangement of parts to be hereinafter more fully described and claimed.

For a complete understanding of my invention, reference is to be had to the following description and accompanying drawing, in which The figure is a vertical sectional view illustrating a device employed in the making of fertilizer in accordance with the herein described method.

The making of the fertilizer in accordance with my method is as follows:

Any suitable earth is first acted upon or treated to render it substantially free of lumps, then gradually passing the earth through a device having smoke passing therethrough so that the smoke and earth mix to cause the earth to become impregnated with carbon contained in the smoke and thereby enrich the earth so that when placed over the ground as a top dressing or mixed with the ground it will enrich the latter. It is desirable that the smoke be from a fire fed with wood, trash, and the like which may be readily obtained from debris accumulated about a farm or like place, thereby permitting a person to obtain fertilizer at an extremely low cost and also produce a fertilizer having highly enriching qualities.

The drawing shows a device for treating the earth in the manner heretofore described and consists of a vertically disposed chamber 1 having a fire box 2 in the lower end in which a fire may burn from trash and other debris fed into the fire box by way of the door 3. A downwardly inclined partition 4 is located in the chamber 1 above the fire box and the lower end communicates with a doorway 5 controlled by a gate 6. The partition 4 is provided with an opening 7 having in communication therewith a funnel shaped element 8 the enlarged end of which is disposed over the fire within the fire box and has located therein a suction fan 9 operated in any suitable manner for drawing the smoke from the fire box into the upper portion of the chamber 1 where it may exhaust by way of a smoke stack 10 provided with a damper 11 for regulating the escape of the smoke from the chamber. A plurality of baffles 12 are located in the upper portion of the chamber 1 and are arranged in spaced and overlapped relation so that earth fed upon the uppermost baffle will gravitate therefrom onto the other baffles and accumulate in the lower portion of the chamber 1 at the doorway 5. An upwardly and inwardly inclined partition 13 is located in the upper portion of the chamber 1 above the series of baffles so that the smoke ascending within the chamber 1 will be caused to pass through the earth gravitating from the baffles to the lower portion of the chamber. The upper end of the chamber has formed thereon an outwardly and downwardly extending hood 14 forming to the upper portion of the chamber an inlet 15. An endless conveyor 16 is disposed in an upwardly inclined plane with the lower end thereof suitably supported and its upper end disposed within the upper end of the chamber 1 by way of the hood 14 of the inlet 15 so that earth may be fed onto the conveyor and carried thereby into the upper end of the chamber 1 and deposited onto the baffles 12. The baffles 12 may be of foraminous material so that the smoke may pass therethrough for treating the earth.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. The herein described method of making fertilizer consisting of making a fire to produce smoke and then passing earth through the smoke to impregnate the latter with carbon contained in the smoke and then placing the earth on the ground and mixing therewith to enrich said ground.

2. A device for making fertilizer comprising a vertical chamber, a fire box in the lower end of the chamber to have a fire built therein for causing smoke to ascend through the chamber, spaced overlapping baffles in the chamber and arranged in the path of the smoke, means for feeding earth to the upper end of the chamber for gravitation over the baffles and through the smoke to become impregnated by the carbon contained in the smoke, and a suction device in the fire box for driving the smoke upwardly and through the earth passing through the chamber.

3. A device for making fertilizer comprising a vertical chamber, a fire box in the lower end of the chamber to have a fire built therein for causing smoke to ascend through the chamber, spaced overlapping baffles in the chamber and arranged in the path of the smoke, means for feeding earth to the upper end of the chamber for gravitation over the baffles and through the smoke to become impregnated by the carbon contained in the smoke, a suction device in the fire box for driving the smoke upwardly and through the earth passing through the chamber, and means whereby the earth treated by the smoke may be accumulated in the chamber and obtained therefrom when desired.

MICHAEL WARD.